(12) United States Patent
Johnson et al.

(10) Patent No.: US 6,395,127 B1
(45) Date of Patent: May 28, 2002

(54) INSERT FOR USE IN CONJOINING TUBULAR END PORTIONS

(75) Inventors: Michael W. Johnson, Minneapolis; Jeffrey J. McKenzie, Watertown, both of MN (US)

(73) Assignee: Entegris, Inc., Chaska, MN (US)

( * ) Notice: Subject to any disclaimer, the term of this patent is extended or adjusted under 35 U.S.C. 154(b) by 0 days.

(21) Appl. No.: 09/295,102

(22) Filed: Apr. 18, 1999

(51) Int. Cl.[7] .............................................. B29C 65/02
(52) U.S. Cl. ................ 156/304.2; 156/304.6; 156/503
(58) Field of Search .............................. 156/158, 304.2, 156/304.6, 503, 583.1

(56) References Cited

U.S. PATENT DOCUMENTS

| | | |
|---|---|---|
| 1,901,634 A | 3/1933 | Dawkins |
| 2,043,020 A | 6/1936 | Thiemer |
| 2,323,039 A | 6/1943 | Hill |
| 2,963,394 A | 12/1960 | Wilkinson |

(List continued on next page.)

FOREIGN PATENT DOCUMENTS

| | | |
|---|---|---|
| EP | 00415068 A2 | 3/1991 |
| GB | 709824 | 6/1954 |
| WO | 98/33639 | 8/1998 |

OTHER PUBLICATIONS

International Search Report dated Jul. 11, 2000.

*Primary Examiner*—Steven D. Maki
(74) *Attorney, Agent, or Firm*—Patterson, Thuents, Skaar & Christensen

(57) ABSTRACT

An insert and method of use for conjoining plastic tubular end portion to form a beadless weldment. The insert comprises a first core portion having a longitudinal axis and a first circumferential surface, and a second tubing contact portion having a longitudinal axis, a second inwardly facing surface and a third circumferential surface, with the second and third surface in concentric relation to each other, and the second tubing contact portion operatively connected to the first core portion. The first core portion and the second tubing contact portion are longitudinally movable relative to each other between a first conjoining configuration and a second removal configuration. In the first conjoining configuration, the first circumferential surface of the first core portion is oriented so that it is in supporting contact with the second inwardly facing surface of the second tubing contact portion, and the second tubing contact portion is further oriented so that the third circumferential surface of the second tubing contact portion is in supporting contact with the interior surfaces of the tubular end portions to be conjoined. In the second removal configuration, the first circumferential surface of the first core portion is oriented so that it is not in supporting contact with the second inwardly facing surface of the second tubing contact portion.

6 Claims, 3 Drawing Sheets

U.S. PATENT DOCUMENTS

| | | | |
|---|---|---|---|
| 3,002,871 A | | 10/1961 | Tramm et al. |
| 3,022,209 A | * | 2/1962 | Campbell |
| 3,030,903 A | | 4/1962 | Morris |
| 3,341,894 A | * | 9/1967 | Flaming |
| 3,727,289 A | | 4/1973 | Bemelmann et al. |
| 4,092,193 A | * | 5/1978 | Brooks |
| 4,228,941 A | | 10/1980 | Persson |
| 4,419,095 A | | 12/1983 | Nebergall et al. |
| 4,465,220 A | | 8/1984 | Ledlow et al. |
| 4,632,292 A | | 12/1986 | Gnyra |
| 4,674,772 A | | 6/1987 | Lycan |
| 4,792,374 A | | 12/1988 | Rianda |
| 4,801,349 A | | 1/1989 | Dommer et al. |
| 4,929,293 A | | 5/1990 | Osgar |
| 4,969,972 A | | 11/1990 | Kunz |
| 5,037,500 A | | 8/1991 | Hilpert |
| 5,090,608 A | | 2/1992 | Jones |
| 5,203,377 A | | 4/1993 | Harrington |
| 5,226,995 A | | 7/1993 | White |
| 5,290,387 A | | 3/1994 | Kramer et al. |
| 5,323,950 A | | 6/1994 | Mamon |
| 5,435,478 A | | 7/1995 | Wood et al. |
| 5,484,506 A | | 1/1996 | DuPont et al. |
| 5,532,459 A | | 7/1996 | Steinmetz et al. |
| 5,622,592 A | | 4/1997 | Tanner et al. |
| 5,632,845 A | | 5/1997 | Stehle et al. |
| 5,814,181 A | | 9/1998 | Richter et al. |

* cited by examiner

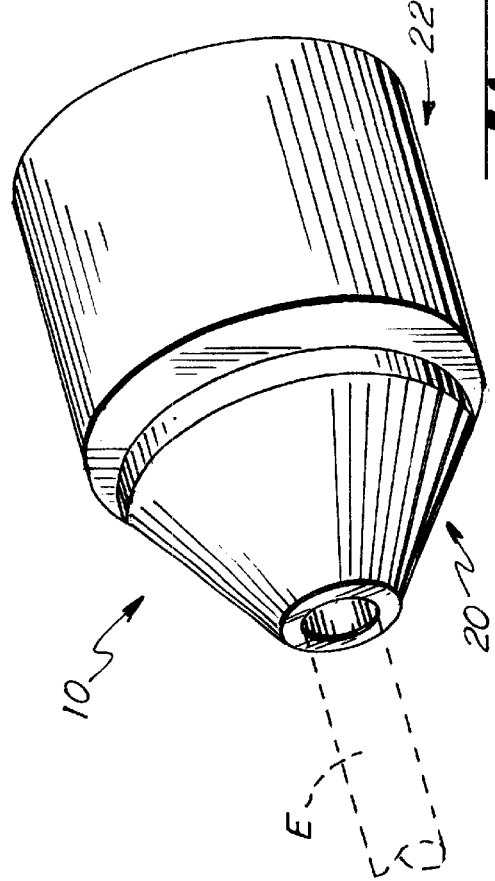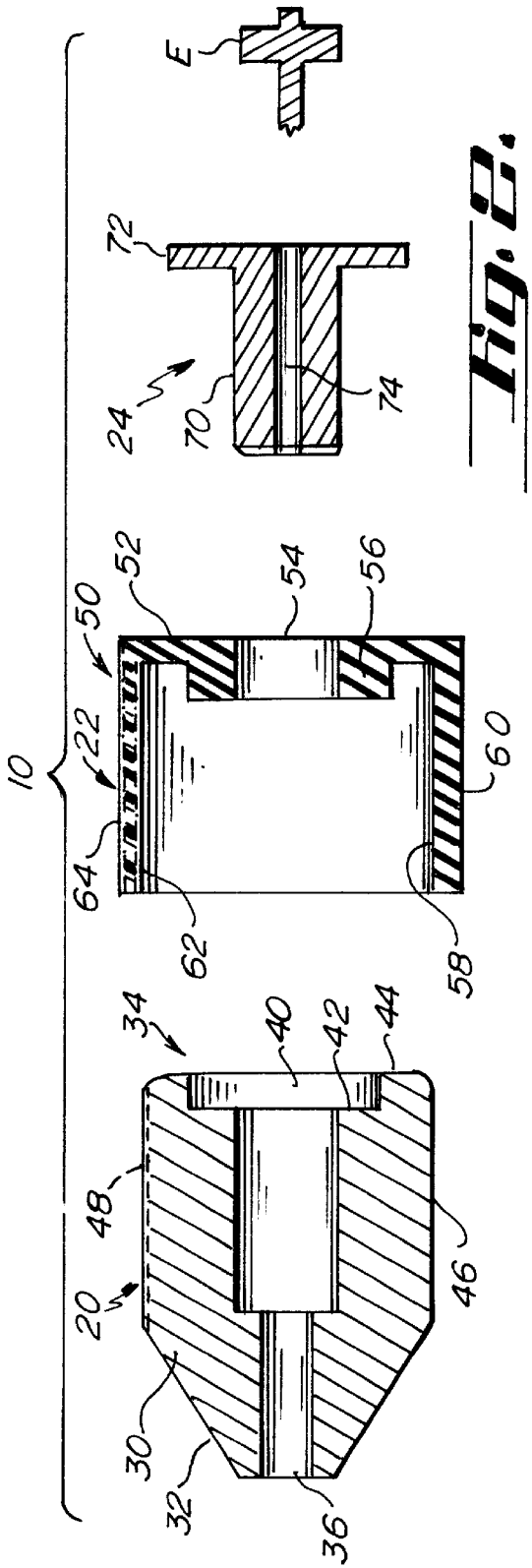

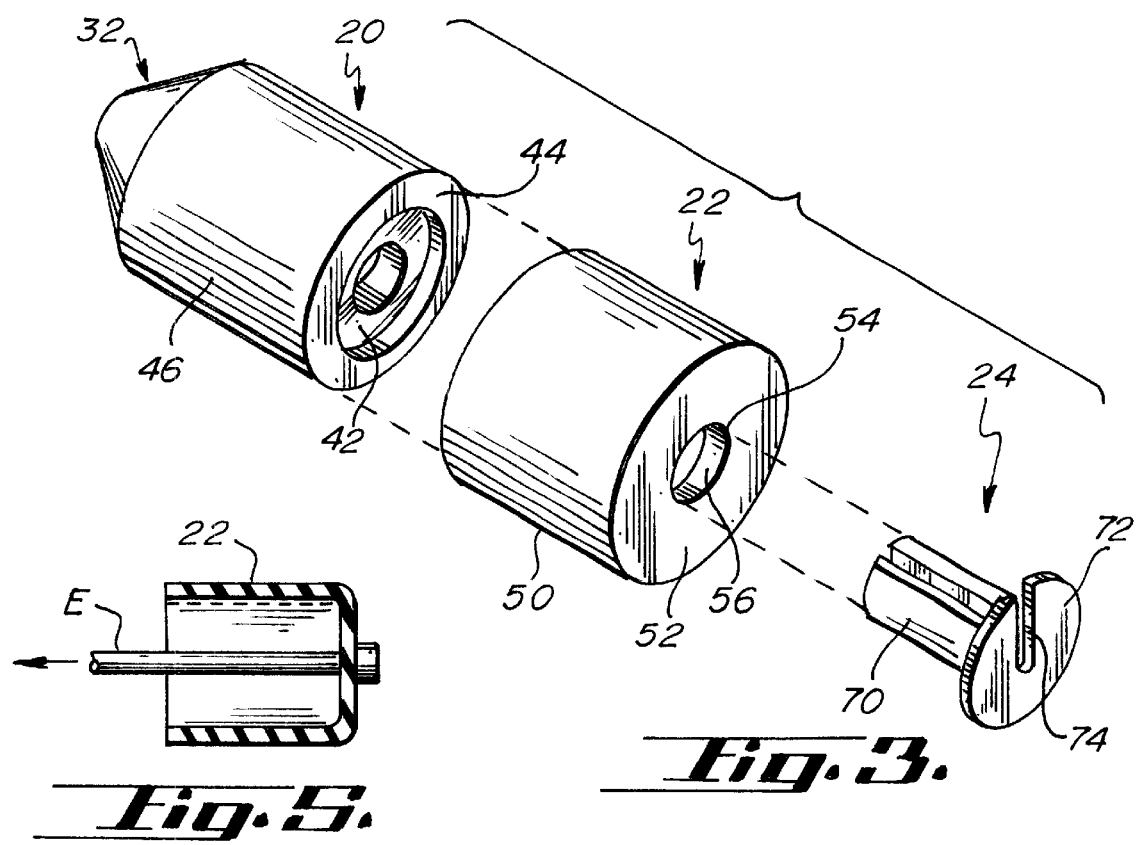
Fig. 3.
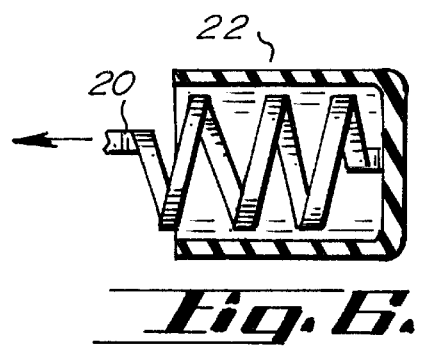
Fig. 5.
Fig. 6.
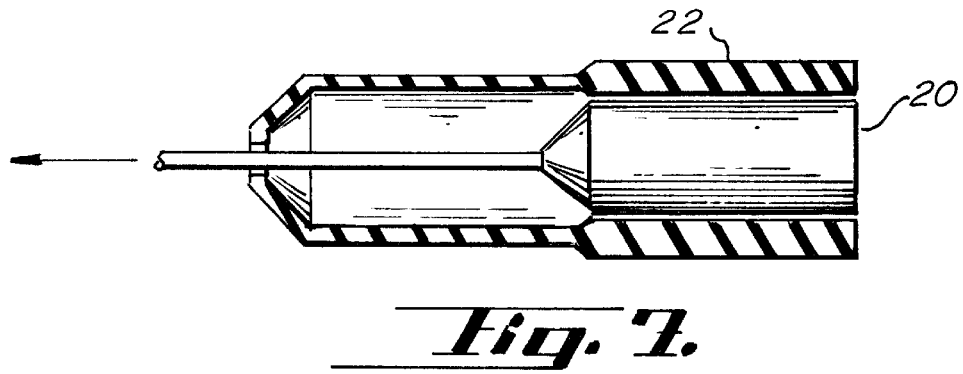
Fig. 7.

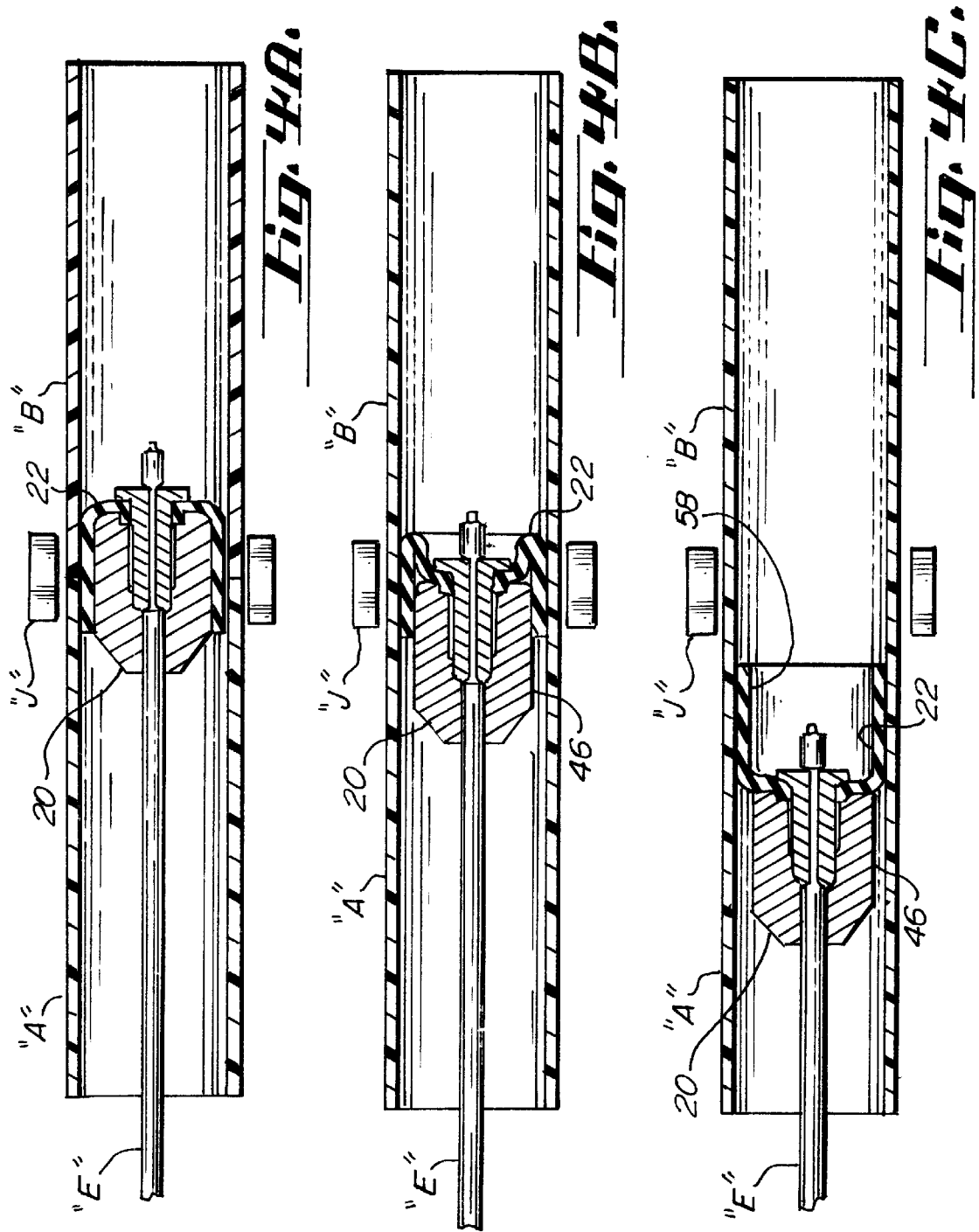

INSERT FOR USE IN CONJOINING TUBULAR END PORTIONS

CROSS-REFERENCE TO RELATED APPLICATIONS

This application is related to application Ser. No. 09/295/03 filed on the same date as this application, entitled "Beadless Welding Apparatus and Method," by inventors Michael W. Johnson and Jeffrey J. McKenzie (attorney docket number 22670-502). This application is incorporated herein by this reference.

BACKGROUND OF THE INVENTION

This invention relates to plastic tubing, and in particular an apparatus and method for joining ends of melt processable plastic tubing together to form a beadless weldment.

Tubing assembly is generally achieved by the use of fittings and fixtures. This is acceptable for many applications, however, there are drawbacks to this form of assembly. When fittings are used to join two tubes together, for example, the interior surface of the assembled tubing is often left with spaces or gaps between the ends of the tubes and the fittings or the ends of the tubes opposing each other. In other words, the interior surface is not smooth. One problem is that particulates may accumulate or accrete in the gaps or spaces and serve as a source of chemical contamination for fluids passing thereby. The accumulated or accreted particulates may also break away from the gap to create a source of physical or mechanical contamination. Another problem with the use of fittings and fixtures is that volatile components of the bonding materials used in assembly may leach out and become a source of contamination. Additionally, the bond itself may adversely react with fluids transported in the tubes and/or may become unduly embrittled or weakened. Another problem that arises is that the uneven interior surface may become a source of unwanted turbulence and flow resistance for fluid passing thereby. Such fittings are, of course, subject to leakage.

These drawbacks are of particular importance in industries where high levels of purity and cleanliness are necessary as in semi-conductor processing or required by law as in food processing.

These problems are alleviated by joining tubes to each other without the use of fittings. This is typically accomplished by welding, fusing, gluing or otherwise joining the tubes together. Concurrent with this shift in methods of assembly is the preferential use of plastic pipes and tubing of material such as perfluoroalkoxy (PFA) over the more traditional stainless steel which is, among other things, relatively hard to fabricate, expensive, and subject to corrosion.

Various means have been known for welding together the ends of thermoplastic pipes, see for example U.S. Pat. No. 4,929,293 to Oscar, which utilizes the placement of an infrared heating plated in between and confronting the tubular end pieces to be joined. The infrared heating plate is removed and the tube joints are then engaged together to create the weld.

With this and other types of assembly, many of the disadvantages of using fittings are reduced or eliminated, resulting in less contamination, increased flow efficiencies and greater overall strength.

There is a problem with these types of assembly, however, in that the seam or junction between tube ends is often not coincident with the interior surface of the conjoined tubes. That is, there may be a bead at the seam or junction which protrudes radially inwardly relative to the interior surface of the conjoined tube and/or there may be a bead at the seam or junction which protrudes radially outwardly relative to the interior surface of the conjoined tube. These beads, though relatively small, can also lead to contamination, turbulence and resistance as discussed above.

Various devices have been developed to reduce or eliminate the radially inwardly protruding seam or junction. These devices generally involve placing a temporary form or insert in the interior of tube ends to be joined, joining the tube ends, and then removing the temporary insert or form. The temporary inserts or forms are usually positioned coincident with the interior surfaces and ends of the tubes to be conjoined so that any gaps therebetween are spanned by the insert. The inserts or forms are of sufficient strength to resist compressive forces incurred during the conjoining process. Some of the devices which have been developed include inflatable bladders, elastically deformable expanding plugs, soluble plugs, frangible plugs, and mechanically adjustable mandrels (see, for example U.S. Pat. No. 5,484,506 to DuPont et al. and U.S. Pat. No. 5,037,500 to Hilpert both of which disclose the use of radially expandable internal mandrels to allow engagement of the interior surface of the tubular end portions to be joined and then allow the mandrel to be radially retracted and removed from the tubing). These devices have their drawbacks, however.

The inflatable bladder insert, for example, is usually longitudinally shaped and is designed to exert a radially extending outward force as it is pressurized. The bladder is not functional as an insert per-se and requires a source of working fluid, a delivery system, and a control system to enable the bladder to be filled and emptied to predetermined pressures. The requirement of such systems not only increases the complexity of the device, it necessarily restricts the number of locations where the device may be operated. Moreover, the bladder may be accidently punctured and lose its ability to be pressurized.

The elastically deformable expanding plugs do not suffer from the infirmities of the bladder, however, they do require specialized tools and fixtures to compress and elastically and radially deform a plug (or plugs) to an operable, supportive position within the tube ends. If the fixture breaks, or the interface between the specialized tools and the fixture becomes damaged, the plug will be inoperable.

Soluble and frangible plugs are designed to be used once and must be destroyed in order to be removed. That is, removal is accomplished by absorption and/or erosion by a suitable fluid medium or by fracturing, respectively. While these types of plugs are simple to use and do not require specialized tools or fixtures, they have their drawbacks in that they are relatively brittle and may break due to mishandling or accident prior to use. And, they may become sources of contamination due to incomplete and/or ineffective removal after use and it can be time consuming to remove such plugs.

Mechanically adjustable mandrels are relatively complicated to fabricate and assemble. They usually comprises a plurality of radially movable parts which are interconnected to each other by spring or similar retaining elements. Their construction permits variety of different tube sizes to be conjoined. Thus, one adjustable mandrel can replace a set of non-adjustable mandrels. This advantage is also a disadvantage in that the adjustable mandrel can come out of adjustment, or the radial parts may become misaligned or lost. Moreover, because they must be adjusted each time they are used on different sized tubes, they create significant down time.

There is a need for a tubing insert or form which is simple to manufacture, easy to install and remove, may be used at a variety of applications at a variety of work locations, and which may be used more than once.

SUMMARY OF THE INVENTION

The present invention solves the drawbacks inherent to the above-mentioned inserts or forms by eliminating the need for extraneous mechanisms, systems, and tools; by eliminating the need to exert stresses on components of the forms during use; by eliminating possible contamination due to incomplete or ineffective removal; and, by minimizing the number of parts and simplifying the operation of the insert.

Generally, the insert of the present invention comprises two portions which are operatively connected to, and longitudinally movable with respect to each other between two different configurations. In the first configuration, the insert is in supporting contact with the interior surfaces of tubing end portions as they are being conjoined, thus facilitating the formation of a beadless weldment. In the second configuration, the insert is manipulated out of supporting contact with the interior surfaces of tubing end portions to be conjoined, thus facilitating removal of the insert from the tubes.

More specifically, the insert comprises a first portion or component and a second portion or component. The first or core portion is generally cylindrical in shape and includes a nose, a tail, and a first circumferential support surface. The nose and the tail of the first core portion are streamlined to facilitate manipulation through non-linear sections of tubing. The preferred material of the first core portion is polyetheretherketone (PEEK) although other similar material may be used. The second or tubing contact portion is also generally cylindrical in shape and includes a skirt and an end wall which are arranged in a generally cup-shaped form. In view of the fact that the preferred plastic tubing material (perfluoroalkoxy (PFA)) used in the semiconductor and food processing industries has a high melting temperature, the material selected for use in at least the skirt of the second tubing contact portion becomes important. The preferred material of the second tubing contact portion is a high temperature silicon No. 010–611 available from Robinson Rubber Mfg., New Hope, Mn. The insert is designed so that in the first conjoining configuration, the first core portion is substantially received within and supportingly contacts the skirt of the second tubing contact portion. When the insert is in the second removal configuration, the first core portion is out of supporting contact with the skirt of the second tubing contact portion. Put another way, the first portion or component and the second portion or component of the insert may be selectively assembled into a support structure to provide support for the tube end portions to be joined or disassembled into a non-support structure to facilitate removal of the insert from the tubing.

Portions of the first core portion and/or the second tubing contact portion of the insert may be provided with friction reducing material, such as polytetrafluoroethylene, to facilitate movement between the first and second configurations and subsequent removal of the insert from the tubing. Such friction reducing material may be integral with the insert portions, or take the form of an additional layer of material, or be applied to predetermined surfaces in predetermined quantities.

In an alternative embodiment, the second tubing contact portion may be used as a stand alone insert. It is envisioned that the application for this embodiment would be useful in situations where tubing is of thin wall construction, and/or is relatively small in diameter.

In another alternative embodiment, the first core portion may be manipulated between a relatively compact form and a relatively expanded form. As the insert is moved from the first conjoining configuration to the second removal configuration, the first core portion and the second tubing contact portion move longitudinally with respect to each other as in the preferred embodiment.

In yet another alternative embodiment, the second tubing contact portion includes an additional coaxial segment which is configured to receive the first core portion as the insert moves from the first conjoining configuration to the second removal configuration.

Although not shown, it is envisioned that the second tubing contact portion may alternatively be formed as a strip of heat-resistant material operatively connected to the first portion and which has been wound about the support surface of the first portion to a suitable thickness. As the first portion is withdrawn, the end of the second portion starts to unwind, thus facilitating removal of the form. It is also envisioned that such a strip may be used over the second tubing contact portion of the preferred embodiment as an insulator, thus extending the working temperature range of the insert.

An object of the preferred embodiment of the invention is to simplify construction of an insert for use in conjoining plastic tubular end portions to form a beadless weldment.

An advantage of the preferred embodiment is that the insert is easy to use.

A feature of the preferred embodiment of the invention is that the first core portion and the second tubing contact portion of the insert are slidingly movable with respect to each other in a longitudinal direction.

Another feature of the preferred embodiment of the invention is that the first core portion and the second tubing contact portion are movable between a first conjoining configuration where the first core portion is in supporting contact with the second tubing contact portion, and a second removal configuration where the first core portion is not in supporting contact with the second tubing contact portion.

Yet another feature of the preferred embodiment of the invention is that one of the portions of the insert is everted when the insert is moved from the first conjoining configuration to the second removal configuration.

A further significant feature of a preferred embodiment of the invention is that the insert can be manipulated through corners such as elbows and "T's."

Additional objects, advantages, and features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

FIG. 1 is a perspective view of the insert of the present invention with the first core portion and second tubing contact portions in a nesting relation, the perspective taken from the exposed end of the first core portion;

FIG. 2 is an exploded, sectional view of the insert showing the first, second and third portions;

FIG. 3 is an exploded, perspective view of the insert, the perspective taken from the exposed end wall of the second tubing contact portion;

FIG. 4A is a sectional view of the insert as it is positioned adjacent the gap defined by unattached tube ends prior to joining, and where the skirt of second tubing contact portion is supported by the first core portion;

FIG. 4B is a sectional view of the insert as it is being withdrawn from the now joined tubes of FIG. 4A, and where the first core portion is in partially supporting contact with the skirt of the second tubing contact portion;

FIG. 4C is a sectional view of the insert in the stage of withdrawal where the first core portion has been brought out of contacting support with the skirt of the second tubing contact portion;

FIG. 5 is a sectional view of an alternative embodiment of the insert, the embodiment comprising the second tubing contact portion only;

FIG. 6 is a sectional view of an alternative embodiment of the insert wherein the first core portion may be manipulated during removal of the insert; and, FIG. 7 is a sectional view of an alternative embodiment of the insert wherein the first core portion is slidingly movable between two segments of the second tubing contact portion.

It is understood that the above figures are for illustrative purposes only and are not meant to limit the scope of the claimed invention.

DETAILED SPECIFICATION

Referring to FIG. 1, the insert is shown is generally identified with the numeral 10. As can be seen, the insert 10 includes a first core portion or component 20 and a second tubing contact portion or component 20. Here, the core portion 20 and the tubing contact portion 22 are in a first conjoining or assembled configuration where the core portion or component 20 is in supporting contact with the tubing contact portion or component 22 and the tubing contact portion or component 22 is in supporting contact with plastic tubular end portions (not shown). The insert 10 is connected or otherwise linked to an actuation element "E" which is used to remove the insert 10 from a weldment location. The actuation element "E" may be a string, cable, bowden cable, ribbon, wire, rod, or other device capable of exerting sufficient force to move the first portion or component 20 relative to the second portion or component 22 from the assembled or conjoining configuration as depicted to a disassembled or removal configuration (see FIG. 4C) and to then extract the insert from the tubing.

Referring to FIGS. 2 and 3, The first core portion 20 comprises a generally cylindrically shaped body 30 having a nose 32 and a tail 34. The body is provided with an axial through hole having a first aperture 36 having a first diameter and a second aperture 38 having a second diameter, with the first aperture 36 located at the nose end 32 of the body 30 and the second aperture 38 located at the tail end 34 of the body 30. As will become apparent, the through hole is configured to engage a third attachment portion 26 which operatively connects the first core portion 20 to the second tubing contact portion 22. The tail end 34 includes a recess 40 which is sized to receive a bead or flange of the second tubing contact portion. As can be seen in FIG. 3, the recess defines a shoulder 42 and a boss 44. The body also includes a first circumferential surface 46 which may be moved into and out of supporting contact with the second tubing contact portion. Note that the length of the core portion or component 20 is relatively short to enable it to be manipulated through non-linear sections of tubing. Further note that the nose end 32 and the outermost periphery of the boss 44 are tapered and rounded, respectively. This is done to facilitate movement of the core portion or component 20 as it is manipulated through connection sites such as "T"s and "Y"s or through sharp bends such as elbows. As will be appreciated, the first circumferential surface 46 may be provided with a layer of friction reducing material 48 (shown in dashed lines) if desired.

The second tubing contact portion 24 comprises a generally cylindrically shaped skirt 50 with an end wall 52, with the skirt 50 and end wall 52 in the shape of a cup. The end wall 52 includes an aperture 54 and an axially extending bead or flange 56 which is received within the recess 40 of the first core portion 20. The skirt 50 includes a second inwardly facing surface 58 and a third circumferential surface 60, with the second and third surfaces 56, 58 in concentric relation to each other. As with the first circumferential surface 46 of the first core portion 20, the second inwardly facing surface 58 and the third circumferential surface 60 may be provided with a layer of friction reducing material (shown in dashed lines as 62 and 64, respectively) if desired.

The third attachment portion 26 comprises a generally cylindrically shaped body having a shank 70 and a head 72. The third attachment portion 26 also includes a slot 74 which extends along the longitudinal axis thereof. The shank 70 of the third attachment portion 26 is configured to slidingly pass through the aperture 54 in the end wall 52 of the second tubing contact portion 22 and into the second aperture 38 of the through hole where it is operatively engaged. As the third attachment portion 26 engages the second aperture 38, the head 72 engages the end wall 52 of the second tubing contact portion 22 and urges the bead 56 into contact with the shoulder 42 of the recess 40 of the first core portion 20. As can be seen, the actuation element "E" includes a thinned segment which is provided with a thicker segment or anchor. The actuation element "El" may be attached to the insert by feeding it through the nose end 32 of the first core portion and positioning the thinned segment within the slot 74 so that the anchor is adjacent the head 72.

Referring to FIGS. 4A, 4B, and 4C, the operation of the insert is depicted. In FIG. 4a, the insert is positioned in a first conjoining configuration. Here, the first core portion 20 and the second tubing contact portion 22 are oriented so that the first circumferential surface of the first core portion 22 is in supporting contact with the second inwardly facing surface of the second tubing contact portion, and the third circumferential surface of the second tubing contact portion is in supporting contact with the interior surface of the tubing ends "A" and "B" to be conjoined. The tubing end portions are conjoined using an appropriate tube end conjoining apparatus "J" and allowed to cool. As depicted in succeeding FIGS. 4B and 4C, after cooling, the insert is moved to the second removal configuration and ultimately withdrawn. Note that a tube end conjoining apparatus "J" is depicted for purposes of illustration only. A more complete understanding of the preferred conjoining apparatus may be obtained by referring to disclosures of the previously referenced related patent application: "Beadless Welding Apparatus and Method."

In FIG. 4B, the insert is in transition between the first conjoining configuration and a second removal configuration. Here, the first circumferential surface of the first core portion 20 has been partially moved out of supporting contact with the second inwardly facing surface of the second tubing contact portion. As the first core portion 20 moves relative to the second tubing contact portion 22, the second tubing contact portion 22, which is relatively flexible, starts to fold upon itself. This folding is facilitated when the friction between the third circumferential surface and the interior surface of the conjoined tube is greater than the friction between the second inwardly facing surface and the first circumferential surface.

In FIG. 4C, the insert is in the second removal configuration and has been moved relative to the weldment (referenced by the tube end conjoining apparatus "J"). As can be seen, the second removal configuration orients the first core portion so that the first circumferential surface 46 is not in supporting contact with the second inwardly facing surface of the second tubing contact portion 22. Note that the second tubing contact portion 22 has continued to fold upon itself so that, in the second removal configuration, it is everted. In this configuration, the positions of the second inwardly facing surface and the third circumferential surface are reversed with the second surface now facing outwardly and the third surface 60 facing inwardly.

Referring to FIG. 5 the insert of the alternative embodiment comprises the tubing contact portion as described in FIGS. 2 and 3. Operation of the tubing contact portion is similar to the operation of the insert as described in FIGS. 4A, 4B, and 4C.

Referring to FIG. 6, the insert of the alternative embodiment comprises a first core portion 20 and a second tubing contact portion 22. This embodiment differs from the preferred embodiment in that the first core portion 20 may be reconfigured as it is being moved from the first conjoining configuration to the second removal configuration. Here, the core is depicted as being a helix which operates thusly. When the insert is in the conjoining configuration, the first core portion is in a compacted form. When the insert is moved to the second removal configuration, the first core portion is reconfigured or manipulated into an expanded form. As the first core portion is reconfigured, the first circumferential surface is brought out of supporting contact with the inwardly facing surface of the second tubing contact surface. Although a helical form is depicted, other forms which can be manipulated between compact and expanded forms may be used.

Referring to FIG. 7, the insert of the alternative embodiment comprises a first core portion and a second tubing contact portion. This embodiment differs from the preferred embodiment in that the second tubing contact portion does not fold upon itself into an everted state. Rather, the second tubing contact portion includes an additional coaxial segment which has an fourth inwardly facing surface and a fifth circumferential surface. Here, the fourth and fifth surfaces are larger than and smaller than the first circumferential surface and the interior surfaces of the tubing to be joined, respectively. As the insert is moved from the first conjoining configuration to the second removal configuration, the first core portion is received in the additional coaxial segment.

Regarding the alternative embodiments of FIGS. 5, 6, and 7, it is understood that such embodiment may include layers of friction reducing material as depicted in FIG. 2.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

We claim:

1. A combination comprising an insert for use in conjoining plastic tubular end portions to form a beadless weldment and a pair of plastic tubular end portions to be joined, the tubular end portions each having an interior surface, the insert comprising:

a) a first core portion, generally cylindrical in shape, having a longitudinal axis and a first circumferential exterior surface;

b) a second tubing contact portion having a longitudinal axis and comprised of a skirt portion having a second circumferential surface and a third circumferential surface, the skirt coextensive intermediate the second and third circumferential surfaces, the second and third circumferential surfaces in concentric relation to each other, the second tubing contact portion operatively connected to the first core portion and longitudinally movable relative to said first core portion whereby the insert has a first conjoining configuration and a second removal configuration;

wherein when the insert is in the first conjoining configuration and is positioned within the tubular end portions with the end portions aborted for conjoining same, the circumferential exterior surface of the first core portion is in support in contact the second circumferential surface of the skirt portion, and the third circumferential surface of the skirt portion is facing radially outward and is in supporting contact with the interior surfaces of tubular end portions;

wherein when the insert is in the second removal configurations, the first circumferential exterior surface of tie first core portion is not in supporting contact with the second inwardly facing surface of the second tubing contact portion and the third circumferential surface of the skirt portion is not in supporting contact with the interior surfaces of the tubular end portions and is facing radially inward thereby facilitating withdrawal of the insert from the weldment.

2. The combination of claim 1, the first core portion having a nose, a tail and a longitudinal through hole; the second tubing contact portion composing an end wall with an aperture; the insert further comprising a third portion, the third portion configured to pass through the aperture in the end wall and engage the first portion at the longitudinal through hole to releasably retain the second tubing contact portion to the first core portion.

3. The combination of claim 2, further comprising an actuation element operatively connected to the third portion for moving the form between the first and second positions.

4. The combination of claim 1, the first core portion further comprising a layer of friction reducing material.

5. The combination of claim 1, the second tubing contact portion further including a layer of friction reducing material.

6. A method of conjoining plastic tubular end portions to form a beadless weldment, the method comprising the steps of:

a) positioning an insert within abutted tubular end portions to be conjoined, the insert comprising:
   a first core portion having a longitudinal axis and a first circumferential exterior surface; a second tubing contact portion comprising a skirt portion in a supporting relation intermediate the first core portion and We interior surfaces of the tubular end portions;

b) heating the junction formed between the tubular end portions and supported by the insert in first conjoining configuration sufficiently to allow conjoining to occur and forming a conjoined weldment;

c) cooling the conjoined weldment;

d) moving the core portion axially within the conjoined tubular end portions and with respect to the skirt portion, thereby everting the second tubing contact portion; and e) removing the insert from the tubing.

* * * * *